United States Patent [19]

Jerry et al.

[11] 4,344,501

[45] Aug. 17, 1982

[54] GEARED HUB

[75] Inventors: James H. Jerry; Ira A. Dickie, both of Goderich, Canada

[73] Assignee: Gearco Limited, Goderich, Canada

[21] Appl. No.: 179,003

[22] Filed: Aug. 18, 1980

[51] Int. Cl.³ .............................................. B60K 17/30
[52] U.S. Cl. ...................................... 180/253; 74/380; 74/606 R; 180/255
[58] Field of Search ............... 180/255, 254, 253, 256; 74/390, 380, 801, 606 R, 607

[56] References Cited

U.S. PATENT DOCUMENTS

| | | | |
|---|---|---|---|
| 2,939,344 | 6/1960 | Harris | 74/606 X |
| 3,864,990 | 2/1975 | Lacoste | 74/606 R |
| 3,931,748 | 1/1976 | Tertinek | 74/606 R |
| 4,108,021 | 8/1978 | MacAfee | 74/606 R |

FOREIGN PATENT DOCUMENTS 1049140  11/1966  United Kingdom ............... 180/255

Primary Examiner—John A. Pekar

[57] ABSTRACT

The specification of the present application discloses a geared hub for use in transmitting power to the wheels of a vehicle. The geared hub is particularly useful for all terrain type vehicles where high strength and reliability are required. The hub uses a one-piece cast housing having various access openings to allow assembly of the unit. The one-piece housing defines an elongated gear chamber which extends generally perpendicular to the wheel spindle. Three access ports are provided; one for supporting the wheel spindle, a second port for allowing the insertion of an input pinion and input shaft, and a third port for allowing insertion of the output gear. The first two ports are located in the end walls of the gear chamber with the third port located in the sidewall of the gear chamber. The unique design, according to the present invention, results in an inherently strong and durable hub having reduced manufacturing and assembly costs.

18 Claims, 4 Drawing Figures

GEARED HUB

FIELD OF THE INVENTION

The present invention relates to geared hubs for driving wheels of a vehicle and particularly, to a hub design which may be used on any wheel of a vehicle.

BACKGROUND OF THE INVENTION

It has been the common practice in four wheel drive type vehicles to use a central gear box, the output of which is fed directly to the individual driven wheels of a vehicle. However, in some applications, particularly where high ground clearance is required, it is desirable to have the drive shaft of each wheel come in at a position higher than the wheel spindle which causes problems with respect to driving the wheel. This problem is overcome by having the drive shaft connected to a pinion gear which is in mesh with an output gear normally splined to the wheel spindle. Due to the use of two gears at the wheel to allow for increased ground clearance, it is possible to reduce the size and gear reduction in the central gear box as some of this gearing is now taking place at the wheel. Although, a geared hub has proven more than satisfactory, in the field, it does introduce problems, particularly with respect to manufacturing of the device as well as the increased cost necessary to produce these units.

It has been the practice to manufacture a two piece gear hub to allow assembly of the gears within the casing and to allow casting of the various housing components. With geared hubs of this type, a high degree of machining is required to assure proper alignment of the casing components upon assembly. Particularly, the alignment of the wheel bearing apertures provided in each section of the housing for receiving wheel spindle has been difficult. Furthermore, these housings are normally vertically split to provide sufficient strength within the geared hub to withstand the forces exerted on the hub as the vehicle is driven over rough terrain. As can readily be appreciated, sealing of vertically split housings is difficult and oil leakage may become a problem. Furthermore, with vertically split housings, it is difficult to utilize the strength of both components to withstand the force exerted on the casing by a vehicle and therefore, one piece of the housing must be made substantially stronger to withstand these forces.

Assembly of split housings is also difficult, as care must be taken to assure the accurately machined abutting flanges of the housing do not warp due to improper bolt tightening procedures. Warping of these surfaces will result in oil leakage and normally cannot be corrected by reassembling the hub. Any misalignment of the plunger will result in excessive bearing wear and excessive gear wear which may or may not be detected when the unit is assembled. Severe misalignment can cause gear tooth breakage and may be detected due to high noise level when the unit is operated.

It can be appreciated that geared hubs are used for all terrain type vehicles and particularly military vehicles. Because of this application, the units must be reliable, inherently strong, require low maintenance and be relatively inexpensive to produce. The present invention mitigates the shortcomings of prior art systems by providing a one piece housing in which the entire unit cooperates to provide the required strength. Furthermore, because of the unique design, the geared hub is compact and can easily be assembled without the high machining costs of split housing arrangements. Furthermore, according to a preferred embodiment of the invention, the problems with respect to oil leaks is further reduced by providing an oil sump in the lower portion of the one piece housing such that the likelihood of leakage through abutting components is reduced.

SUMMARY OF THE INVENTION

A geared hub for driving wheel of a vehicle according to the present invention, comprises a one-piece cast housing having an elongated gear chamber, a wheel spindle extending through said chamber and generally perpendicular thereto, an output gear and an input pinion, with the output gear driving said wheel spindle and in mesh with the input pinion. The housing has first access means for receiving and supporting the wheel spindle, second access means for receiving an input shaft associated with the input pinion and third access means in a sidewall of the housing for inserting the output gear. The first and second access means are in the end walls of the gear chamber, and include means for closing the access means. The one-piece housing also includes means for mounting the housing to a vehicle.

In a more simplified version, the invention includes a one piece housing for use in a geared hub for driving a vehicle wheel spindle by use of an input shaft engaging an input pinion which meshes with an output gear drivingly connected to the wheel spindle. The one piece casing defines an elongated gear chamber having first access means for receiving and supporting a wheel spindle, second access means for receiving an input shaft and third, access means in a side wall of said gear chamber for inserting such gears. The gear chamber extends generally perpendicular to the wheel spindle and the first and second acess means are positioned in the endwalls of the geared chamber.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
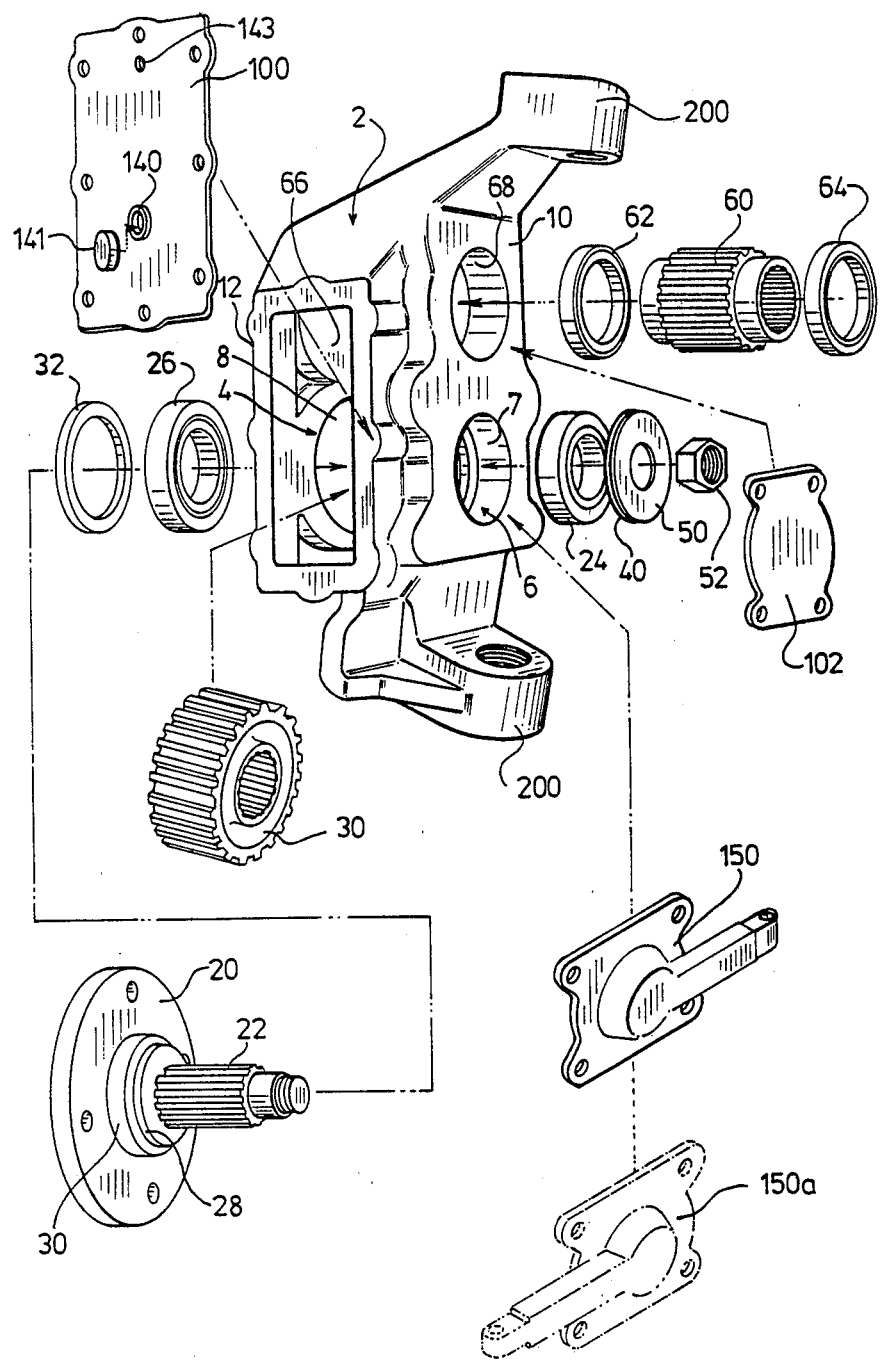
FIG. 1 is an exploded perspective view of the complete gear hub assembly
Figure 2:
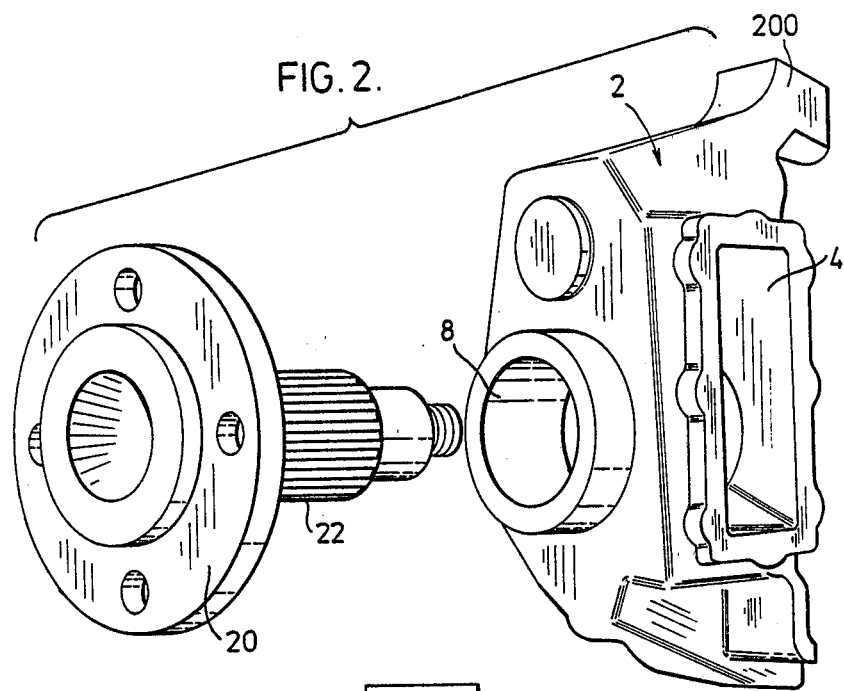
FIG. 2 is a perspective view with the wheel spindle withdrawn from the geared hub.
Figure 3:
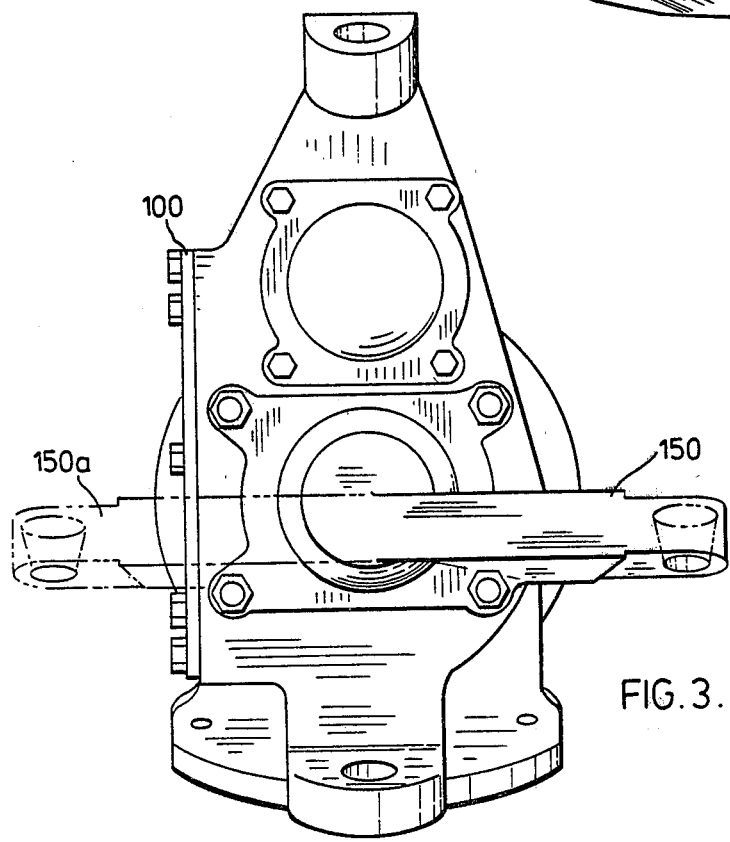
FIG. 3 is an end view of the geared hub illustrating the securement of the radius arm.

The device as shown in FIG. 1 is centered about the one piece cast housing 2 which includes the elongated gear chamber 4. First access means generally shown as 6 includes two apertures 7 and 8 provided in the end walls 10 and 12 of the casing. This first access means is roughly formed during the casting operation of the geared housing and apertures 7 and 8 can be precisely machined thereby avoiding alignment difficulties encountered in the assembly of split case housings. For example, it would be quite simple to program a numerical control machine to automatically drill apertures 7 and 8, thereby assuring accurate alignment. The first access means allows the wheel spindle 20 to pass through the housing and through output gear 30 which has been placed within the gear chamber and aligned with the shaft 22 of the wheel spindle. Bearing 24 and 26 are provided either end of the wheel spindle and engage apertures 7 and 8 respectively. Bearing 26 is sized to easily slide over the splined shaft portion 22 and engage surface 28 provided on the wheel spindle. Stepped portion 30 of the wheel spindle engages sealing ring 32 to seal aperture 8 of the gear chamber. Snap ring 40 is provided to cooperate with shaft 22 and accurately position output gear 30 on the shaft. Bearing 24 cooperates with aperture 7 which has a stepped cross section whereby, washer 50 and nut 52 may be used to adjust the end play of the wheel spindle with respect to the bearings.

The input pinion 60 is secured within the casing by bearings 62 and 64. Bearing 62 engages recess 66 provided in one end wall of the housing and bearing 64 engages aperture 68 provided in the opposite end wall of the housing. As shown, input pinion 60 is inserted directly through aperture 68 which forms a second access means in one end wall of the casing. A permanent cover plate 100 is sized to close rectangular opening 4 provided in a sidewall of the casing. Cover plate 102 is sized to close aperture 68 however, this will only be necessary if the unit is to be stored or shipped to another location. This cover plate would be removed when the splined input shaft is placed within the input pinion 60.

Radius arm 150 is provided to cover and seal aperture 7 and when it is not possible, due to the particular vehicle construction, to have symmetrical radius arms, two radius arms may be provided (150 and 150a), one for either side of the vehicle. Where the geared hub is to be used for a rear wheel, the radius arm may merely be secured to the frame in a manner to maintain alignment of the wheel. At the top and bottom of the geared hub mounting brackets 200 are provided which form part of the king pin mounting arrangement used to pivotally secure the hub to a vehicle. These mounting brackets transmit the force exerted by the wheel on the casing to the frame of the vehicle.

In assembling the structure, bearings 62, 26, and 24 are positioned within the gear chamber and input pinion 60 and bearing 64 are then secured in place. The output gear may then be inserted within the gearchamber through rectangular opening 4 and positioned to align with the wheel spindle 20. It can thus be appreciated, that this output gear 30 is splined and carried on the wheel spindle which is supported within the case by bearings 26 and 24. All apertures 7, 8 and 68 are subsequently sealed and the wheel spindle adjusted by nut 52 such that the end play on the wheel spindle is within acceptable tolerances, less than seven thousandths of an inch. Cover plate 100 and radius arm 150 are then installed and sufficient oil for lubrication of the system is placed in the gear cavity through aperture 140 provided in the cover plate. This aperture is subsequently sealed by plug 141. A vent aperture 143 is provided within cover plate 100 and a vent line (not shown) may be inserted to assure water does not enter the gear housing. After assembly of the unit, various quality control checks such as backlash can be conducted.

It can thus be appreciated that the hub according to the present invention when completed, forms a finished product with no adjustment being required when the unit is installed on a vehicle. However, oil is normally added during installation of the unit on a vehicle.

Figure 4:
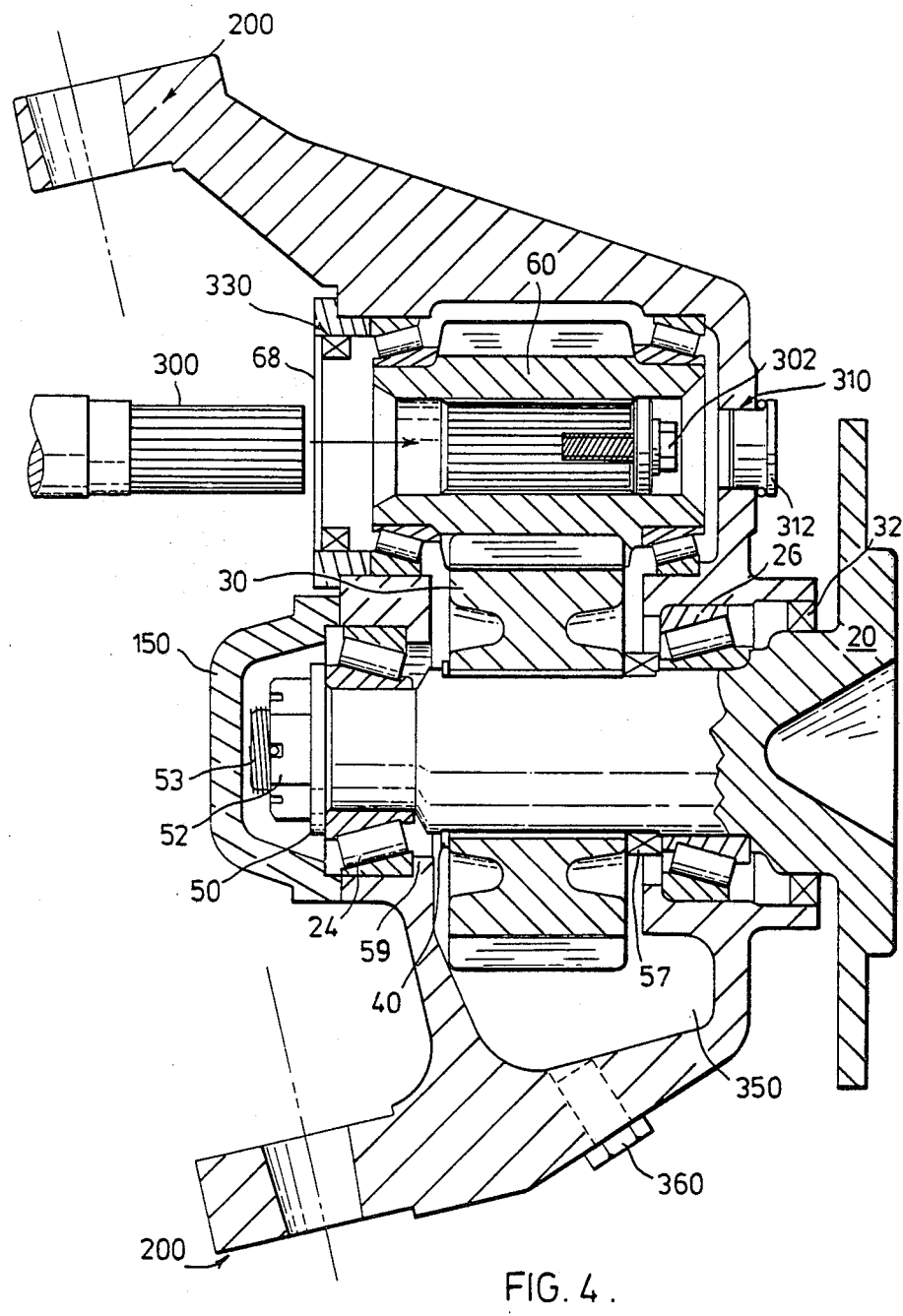
FIG. 4 is a vertical section through the geared hub.

The installation of the unit on a vehicle is simplified as shown in FIG. 4 where an input shaft 300 is merely inserted within the splined input pinion 60 and maintained in this position by bolt 302. A small aperture 310 is provided within the casing to allow access to the head of a bolt 302 and a cup 312 is provided to seal this aperture when the input shaft has been properly secured. It can thus be appreciated that power is transmitted from the main transmission through input shaft 30 to the input pinion 60 to output gear 30 which drives wheel spindle 20. A small oil sump 350 is clearly shown in the cross section and is positioned essentially below the rectangular aperture 4. Because of this the unit is not as vulnerable to oil leaks as two piece housings. A magnetic drain plug 360 is shown at the base of the sump for draining thereof.

As shown in FIG. 4, a seal 32 is provided about the wheel spindle 20 and spacer 57 in combination with snap ring 40 positively locate outut gear 30. With radius arm 150 removed, nut 52 may be tightened on shafts 53 such that the end play of the wheel spindle can be set. The nut is then locked in position by cotter pin 147. With respect to the input shaft 300, a combination gasket and sealing ring 330 is provided at the mouth of aperture 68 for engaging input shaft. As can be appreciated, the output gear 30 contacts oil within the sump 350 thereby, circulating oil throughout the gear chamber.

Furthermore, due to the particular arrangement, the input shaft 300 is positioned above the wheel spindle thereby, allowing the radius arm to be located higher on the housing and in this case, adapted to cover the wheel spindle. In direct drive systems, the radius arm would be located below the wheel spindle resulting in reduced ground clearance than the present arrangement.

Forces exerted on the wheel spindle are transmitted to the mounting means 200 by both end portions of the gear casing and therefore, these end walls cooperate to provide sufficient strength to withstand these forces. The integral casing in combination with the placement of apertures within the arrangement provides an inherently strong structure which utilizes the strength of all components to satisfy the necessary design restraints while still providing a compact gear hub.

The one piece housing also allows accurate machining of the apertures for the wheel spindle and the impact shaft without requiring excess machining to assure alignment of these apertures. The one piece structure also allows quality control tests to be conducted with respect to the alignment of the various apertures prior to the assembly operation, thereby allowing unacceptable housings to be rejected without experiencing the additional cost incurred in assembling the hub. This results in a hub which has low manufacturing costs in combination with high accuracy with respect to tolerances. The resulting unit is inherently strong and suitable to be manufactured as a finished product that can be easily installed by the end user. All hub adjustments are made prior to the installation of an input shaft and therefore, the quality control of the geared hub can be accurately monitored within the manufacturing plant. Furthermore, the one piece housing results in low maintenance with also a low probability of oil leaks commonly found in prior art structures.

Because the hub is of a universal design, it may be used on all four wheels of a vehicle with only the radius arm requiring replacement should a non-symmetrical steering arm be required. In any event, the universal design of the hub allows reduction in warehousing expense for both the producer and the end users who must warehouse components for future demand as well as replacement. This is particularly advantageous for military applications, due to the large number of vehicles used and the requirement to have replacement components immediately available. Furthermore the universal hub design allows old equipment to be cannibalized efficiently. Where non-symmetrical steering arms are required to complete both left and right hub assemblies, only the radius arms require duplicative warehousing.

Thus it can be seen that this invention provides a very compact, strong geared hub which due to its unique arrangement allows the hub to be utilized on all wheels of a vehicle when used in combination with a radius arm. It can readily be appreciated that if a breakdown should occur in the field, it will usually occur to the geared hub or to the radius arm and thus it is desirable that each of these components be made separately as opposed to being integral as repair will only require replacement of one of these components.

The hub design also uses an appropriate two to one gear reduction at the hub, thereby redusing the size and strength of the components upstream. For example, inboard brakes may be used of smaller capacity, lighter drive shafts may be used and the centre axle pod may be smaller.

Although the invention has been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A geared hub for driving wheel of a vehicle comprising a one-piece cast housing having an elongated gear chamber, a wheel spindle extending through said chamber and generally perpendicular thereto, an output gear and an input pinion, said output gear driving said wheel spindle and in mesh with said input pinion; said housing having first access means for receiving and supporting said wheel spindle, second access means for receiving an input shaft associated with said input pinion and third access means in a sidewall of said housing for inserting said output gear, said first and second access means being in the end walls of said gear chamber, and including means for closing said access means, said one-piece housing including means for mounting said housing to a vehicle.

2. A geared hub as claimed in claim 1 wherein said mounting means includes two king pin connection flanges extending from the end of the housing with one located above and the other located below said gear chamber, said first access means being generally centrally located relative to said gear chamber and said second access means located generally above said first access means, said closing means associated with said first access means including a radius arm for connection with the vehicle to control the position of said geared hub relative to the vehicle.

3. A geared hub as claimed in claim 1 wherein said radius arm forms part of the steering system of a vehicle.

4. A geared hub as claimed in claim 1 wherein said radius arm is connectable to the vehicle frame to lock said hub relative to the frame.

5. A geared hub as claimed in claim 1 or 2 wherein said third access means is a generally rectangular opening located above the base of the gear chamber.

6. A geared hub as claimed in claim 1 or 2 wherein said first access means includes two circular aligned aperatures for receiving wheel spindle bearings at either end of said one-piece housing.

7. A geared hub as claimed in claim 1 or 2 wherein said first access means includes two circular aligned aperatures for receiving wheel spindle bearings and said second access means includes two aperatures, one for receiving an input shaft and the second aperature allowing access to secure said shaft within said input pinion.

8. A geared hub as claimed in claim 1 wherein said wheel spindle is splined through the center of said output gear and is supported either side of said gear chamber by bearings, said spindle including means at one end thereof for adjusting the end play of said spindle and including means for locating said output gear within said gear chamber.

9. A geared hub as claimed in claim 8 wherein said means for locating said output gear includes a snap ring associated with said wheel spindle.

10. A geared hub claimed in claim 1, 8, or 9 wherein said input gear is splined to receive an input shaft, said housing including an access port generally aligned with said input gear for securing of such input shaft within said input gear chamber and said hub having an approximate 2 to 1 gear reduction.

11. A geared hub as claimed in claim 1 or 8, wherein said mounting means includes a radius arm secured to said gear casing sized to cover one end of said wheel spindle and to provide a torque arm for controlling the position of said hub, said mounting means including two king pin apertures for pivotally securing said hub to a vehicle.

12. The geared hub as claimed in claim 1 wherein said gear chamber includes an oil sump at the bottom thereof below all of said access means.

13. In a geared hub for driving a vehicle wheel spindle having an input shaft engaging an input pinion which is in mesh with an output gear for driving the wheel spindle, a one piece cast housing defining an elongated gear chamber and having first access means for receiving and supporting a wheel spindle, second access means for receiving an input shaft and third access means in a sidewall of said gear chamber for inserting such output gear, said gear chamber extending generally perpendicular to such wheel spindle, and said first and second access means being in the end walls of said gear chamber.

14. In a geared hub as claimed in claim 13 wherein said third access means is a generally rectangular opening located above the base of the gear chamber.

15. In a geared hub as claimed in claims 13 or 14 wherein said first access means includes two circular aligned apertures for receiving wheel spindle bearings.

16. In a geared hub as claimed in claims 13 or 14 wherein said first access means includes two circular aligned apertures for receiving wheel spindle bearings, and said second access means includes two apertures, one for receiving such input shaft and the second aperture allowing access to secure such shaft in place.

17. A geared hub for driving a wheel of a vehicle comprising a one-piece housing defining an elongated gear chamber, a wheel spindle extending through said chamber and generally perpendicular to the major axis thereof, an output gear splined to said wheel spindle which passes through the center of said output gear, an input pinion in said gear chamber above and in mesh with said output gear, access means in said cast housing for receiving an input shaft to drivingly engage said input pinion, a large generally rectangular opening in one sidewall of said housing for inserting said output gear into said gear chamber, a cover plate for closing said rectangular opening, and mounting means for securing said casing to a vehicle wherein said wheel spindle and said input gear are bearingly supported in the sidewalls of said housing.

18. A geared hub as claimed in claim 17 wherein said mounting means includes a radius arm secured to said casing and sized to cover one end of said wheel spindle whereby the radius arm forms part of a steering system for said geared hub.

* * * * *